United States Patent [19]

Jensen et al.

[11] Patent Number: 4,696,338

[45] Date of Patent: Sep. 29, 1987

[54] LATENT HEAT STORAGE AND TRANSFER SYSTEM AND METHOD

[75] Inventors: Eric A. Jensen, Salt Lake City, Utah; James Hitchin, Del Mar, Calif.; Albert G. Tsai, San Diego, Calif.; Gustaf O. Arrhenius, La Jolla, Calif.

[73] Assignee: Thermal Energy Stroage, Inc., San Diego, Calif.

[21] Appl. No.: 708,669

[22] Filed: Mar. 6, 1985

Related U.S. Application Data

[63] Continuation of Ser. No. 382,971, Jun. 1, 1982, abandoned.

[51] Int. Cl.[4] .............................................. F28D 21/00
[52] U.S. Cl. .......................................... 165/1; 165/10; 165/104.11; 165/104.17; 252/70; 252/69
[58] Field of Search ...................... 165/104.17, 104.11, 165/10, 1; 252/70, 69

[56] References Cited

U.S. PATENT DOCUMENTS 2,095,008 10/1937 Phillip ............................ 165/104.21
4,154,292 5/1979 Herrick ........................... 165/104.11
4,466,478 8/1984 Carlsson et al. ................ 165/104.17

FOREIGN PATENT DOCUMENTS

28436. 3/1979 Japan ............................... 165/104.17

*Primary Examiner*—Albert W. Davis, Jr.
*Attorney, Agent, or Firm*—Brown, Martin, Haller & Meador

[57] ABSTRACT

Heat storage and transfer system and method in which a liquid-solid phase change material and a liquid-vapor phase change material selected for coaction with each other are disposed in a container with a body of the liquid phase of the liquid-vapor material in continuous contact with a body of the liquid phase of the liquid-solid material for superior heat transfer between the materials for giving up and transferring sensible heat and liquid to solid phase change latent heat to vaporize liquid-vapor phase change material and vapor to liquid phase change latent heat to a condenser/heat exchanger and also for superior heat transfer from a heat source such as a solar or electric heater by giving up the heat of condensation of a vapor phase to a solid-liquid material which accepts the heat as sensible heat and as heat of melting.

28 Claims, 3 Drawing Figures

LATENT HEAT STORAGE AND TRANSFER SYSTEM AND METHOD

This is a continuation of application Ser. No. 382,971 filed June 1, 1982, now abandoned.

BACKGROUND OF THE INVENTION

Heat storage is required in solar systems to buffer the fluctuations in and between energy collection and release. Heat storage also enables use of waste or surplus heat from industrial processes. Heat storage at low temperature is also required to allow the use of cooling machinery during times other than the time of use of the cooling capacity for space cooling, air conditioning and other purposes.

While heat may be stored by raising the temperature of the storage material, as in sensible heat storage, latent heat storage offers numerous advantages over sensible heat storage. The heat of transition in melting is generally greater than the heat capacity of a material integrated over a practical temperature range, hence a larger amount of energy can be stored in a given storage volume as latent heat of melting than as sensible heat. Additionally, latent heat storage systems provide heat at a constant output temperature, the transition temperature of the phase change, in contrast to a sensible heat storage system in which the output temperature decreases as heat is removed.

In a latent heat storage system, heat is added to the storage medium until it has undergone complete phase change. The transition most commonly used is solid to liquid. Systems based on the melting of salts or salt hydrates are convenient to work with and have high energy densities. Input heat is stored as heat of melting and additionally as sensible heat and, when heat is required, the melt, which may indefinitely be kept supercooled in the interim, is nucleated and heat is removed as the liquid crystallizes.

A major problem in previously known systems of this type is the removal of heat from the crystallizing body. The use of conventional heat exchangers immersed in the solid-liquid phase change materials (hereinafter referred to as PCM) has been hampered in known systems by two significant problems. During the heat removal cycle, the solid crystallizes and coats the exchanger surfaces thus increasing their thermal resistance and decreasing the rate of heat transfer. Also, in the solid state, the materials may contract away from the heat exchanger surfaces which leads to a decrease in the initial rate of melting during the heating cycle. Efforts to solve these problems have included coating the heat exchange surfaces with surfactants and non-adhesive materials, such as "Teflon" without notable success. Attempts to modify the crystal habit of the PCM with additives to weaken the crystal aggregate have not provided a satisfactory remedy. And mechanical methods for clearing the heat exchange surfaces are cumbersome, energy demanding and have had only limited effectiveness.

Heat exchange by direct contact between the crystallizing PCM melt and an immiscible, non-volatile heat transfer liquid has been proposed to eliminate the need for a conventional heat exchanger. Silicone oil and other immiscible, non-volatile fluids are pumped through or swirled over the molten PCM and heat is removed as sensible heat of the fluid. This method suffers from the difficulty that the fluid stream may carry droplets and crystals of the PCM which clog the secondary heat exchange system. The method is also inefficient because of the unsatisfactory heat carrying capacity of the oil or other non-volatile heat transfer fluids.

A further heat exchange system has involved pumping a molten salt mixture at a temperature of from 250 degrees to 350 degrees C. into a boiler, injecting water into the molten salt mixture where it is flashed into steam by the molten salt and the steam is passed to a condenser/heat exchanger to deliver heat. The slurry of molten salt and salt crystals formed in delivering latent heat is pumped out for heating to melt the crystals in the slurry before return to the boiler. The system requires complicated and expensive apparatus and suffers from the further disadvantages that the steam tends to carry salt over to the condenser/heat exchanger surface, that the area of heat transfer from the salt to liquid water is limited to the water jets before conversion of the liquid water to steam, that the temperature range is unnecessarily high causing safety and implementation problems in high entropy heat applications, and that the system requires substantial mechanical energy. A further disadvantage is that in order to remain fluid enough for pumping and to allow passage of water and steam for delivery of heat, only a limited proportion of the salt in the boiler can be allowed to crystallize, thus limiting the effective energy density of the system. Finally, the method is not applicable to supercooling salt hydrate melt storage systems, but only to anhydrous salt melts at high temperature which inevitably lose their heat to the environment; only short term storage, associated with substantial heat losses, could thus be achieved if use of this method were attempted.

BRIEF SUMMARY OF THE INVENTION

The present heat storage and transfer system and method provide high energy density and high heat delivery efficiency through the combination of a liquid-solid phase change material and a liquid-vapor phase change material with partial solubility in the liquid-solid phase change material and selected for coaction with each other and disposed in a container with a body of the liquid phase of the liquid-vapor material in continuous contact with a body of the liquid phase of the liquid-solid material for superior heat transfer between the materials for giving up and transferring liquid to solid phase change latent heat to vaporize liquid-vapor phase change material and, in one form of the invention, vapor to liquid phase change latent heat to a condenser/heat exchanger.

A notable feature of the subject invention Latent Heat Storage and Transfer System that yields thermal energy efficiency advantages over earlier systems is the use of liquid-solid and liquid-vapor phase change materials that permit the formation of refrigerant gas hydrates, or clathrates. Clathrate formation is realized by the selective use of liquid-vapor phase change materials that exhibit up to 5% solubility in the liquid-solid phase change material.

BRIEF DESCRIPTION OF THE DRAWINGS

The invention will be discussed with reference to the associated drawings in which.

DESCRIPTION OF THE PREFERRED EMBODIMENTS

Figure 1:
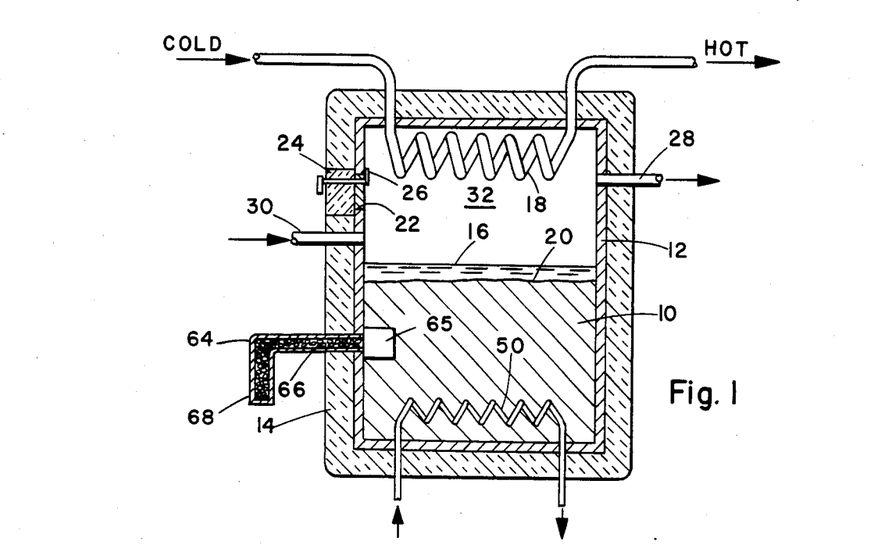
FIG. 1 is a side elevation view in section of one form of the latent heat storage and transfer system of the present invention.

In the method and system of the present invention, heat is extracted from a molten body of crystallizable phase change material, PCM, by disposing the molten body 10 of PCM in a closed container 12 surrounded by insulation 14 and providing a body of heat transfer material in liquid state shown as a layer 16 on the surface of the body of PCM. As discussed below, the body of heat transfer liquid may also be below the body 10 of PCM where its specific gravity is greater than that of the PCM. Heat transfer materials are chemically stable volatile liquids immiscible with or partially soluble in the molten PCM, for forming a stoichiometric component of the crystalline phase change material and having boiling points at operational pressures selected relative to the melting points of the phase change materials for controlled vaporization of the liquid by heat from crystallization of the phase change material while maintaining portions of the heat transfer material in liquid state in contact with the PCM. By vaporizing the transfer material and thereafter condensing it on a conventional condenser/heat exchanger 18, the system takes advantage of the heat of vaporization of the liquid which is much greater than its specific heat and therefore provides much greater heat transfer efficiency. Additionally, maintaining the body such as the layer 16 of liquid transfer material in contact with the PCM results in boiling of the transfer liquid in contact with the body of PCM and provides mixing of the liquid and PCM at the interface 20 to insure continuous effective contact between the transfer liquid and the latent heat releasing crystallizing melt and eliminates the need for mechanical stirring devices.

Phase change materials, PCM, for use in the present system are selected from crystallizable substances of which the melting point is in a range determined by the temperature at which it is desired to deliver heat and, in some situations, by the temperature of a heat supply available for recharging heat to the body of PCM. It is also important to select materials which have a large heat of crystallization. For domestic space and water heating and cooling, materials which change phase from liquid to solid at temperatures in the range of from about −20 degrees C. to about 95 degrees C., are useful. Suitable phase change materials include:

| PHASE CHANGE MATERIAL | MELTING TEMPERATURE (°C.) | LATENT HEAT OF MELTING (kJ/kg) |
|---|---|---|
| Sodium thiosulfate pentahydrate $Na_2S_2O_3.5H_2O$ | 48 | 200 |
| Sodium acetate trihydrate $CH_3COONa.3H_2O$ | 58 | 265 |
| Aluminum ammonium sulfate dodecahydrate $NH_4Al(SO_4)_2.12H_2O$ | 93 | 164 |
| Calcium chloride hexahydrate $CaCl_2.6H_2O$ | 32 | 170 |
| Disodium hydrogen phosphate dodecahydrate $Na_2HPO_4.12H_2O$ | 36 | 266 |
| Sodium sulfate decahydrate $Na_2SO_4.10H_2O$ | 32 | 246 |
| Magnesium nitrate hexahydrate $Mg(NO_3)_2.6H_2O$ | 90 | 160 |
| Eutectic of magnesium chloride hexahydrate and magnesium nitrate hexahydrate $MgCl_2.6H_2O$ and $Mg(NO_3)_2.6H_2O$ | 59 | 141 |
| Eutectic of ammonium chloride and sodium sulfate decahydrate $NH_4Cl.Na_2SO_4.10H_2O$ | 11 | 163 |
| Water ice $H_2O$ | 0 | 334 |

Heat transfer fluids are selected to have boiling points near but not higher than, and preferably at least about 10 degrees C. lower than, the melting point of the PCM at the dynamic vapor pressure maintained in the container and are used in sufficient quantities that portions of the fluid may remain liquid in contact with the PCM where boiling of the liquid will provide a mixing action to insure continuous effective contact between the liquid and the latent heat releasing crystallizing melt. In general useful transfer fluids are chemically stable, volatile organic or inorgaic. liquids, non-reactive with and partially soluble in the molten PCM and stoichiometrically included in the crystallized PCM. The liquids may thus be immiscible with the molten PCM, but preferably, in cases discussed below, are partially soluble in the molten material. Halocarbons, mainly substituted methanes and ethanes, have been found desirable, but simple hydrocarbons and other chemically stable fluids are useable provided that they are capable of forming clathrates and have the appropriate vapor pressures, (boiling points), as specified above. For instance, for space heating and water heating, preferred boiling points would be in the range of from about 30 degrees C. to about 80 degrees C. at atmospheric pressure but liquids outside this range may be useful for delivery or absorption of heat in special situations. With these liquids, the internal pressure of the system is increased, for example, up to about one atmosphere overpressure to elevate the boiling temperatures to values suitable for domestic water and space heating and cooling at the output of the system.

A partial list of heat transfer fluids for use in the present system includes:

| Halocarbons ("Freons") | | Boiling point (1 atm.) °C. |
|---|---|---|
| $(CCl_2F)_2$ | R-113 | 47.6 |
| $CCl_3F$ | R-11 | 23.8 |
| $CHCl_2F$ | R-21 | 8.9 |
| $(CClF_2)_2$ | R-114 | 3.8 |
| $CCl_2F_2$ | R-12 | −29.8 |
| $(CBrF_2)_2$ | FC-114B2 | 47.3 |
| $CH_2Cl_2$ | R-30 | 40.0 | and other stable organic liquids such as hexafluoroisopropanol, B.P. 58.2°, 1,1-difluoroethane, B.P. −25.0°, 1,1,1,-chlorodifluoroethane, B.P. −9.7°, hexafluoroacetone, BP. −28°, and 2-methylbutane, B.P. 28°, and ammonia, $NH_3$ B.P. −33.4° C., which is particularly useful in low temperature applications because of its high heat of vaporization.

It is noteworthy that when the PCM is composed of $H_2O$ and a heat transfer fluid such as R-11, R-21 or R-12 shown above, or other similar refrigerants, that the subject invention Latent Heat Storage and Transfer System exhibits thermal energy efficiency advantages over earlier systems due to the formation of refrigerant gas hydrates, or clathrates. A Clathrate is a compound formed by the inclusion of molecules of one kind in cavities of the crystal lattice of another. The latter one is for the non-stoichiometric combining $H_2O$ and the varous refrigerants. Gas hydrates form a class of clathrates or inclusion compounds in which a hydrogen-bonded water molecule lattice encloses a guest molecule of gas. Gas hydrates have a high heat of formation which make them ideal as cool storage media. The size of the guest molecule encased in the hydrogen bonded water molecule lattice is one factor determinative of clathrate formation. A second factor is the solubility of the gas molecule in the $H_2O$ component of the phase change material. It is necessary that there be significant solubility of the guest molecule and generally, up to 5% solubility is desired. There are many gases which can form gas hydrates, including the noble gases, halogens, straight-chain hydrocarbons and, halogenated hydrocarbons or common refrigerants used in vapor compression cycles.

It is important to note that partial solubility of the heat transfer fluid is required for several reasons. In those instances where the PCM is composed of a salt, partial solubility permits heat transfer via nucleate boiling. Nucleate boiling is a well known phenomena and improves the overall heat transfer rate in a binary system, as is present in the invention, by increasing the heat transfer surface area between the heat transfer fluid and the PCM. If the heat transfer fluid is insoluble, then boiling occurs only at the limited interfacial area between the layers of the heat transfer fluid and the PCM.

In those instances where clathrate formation is involved in the heat storage/exchange events, partial solubility of the heat transfer fluid is key for two reasons. First, partial solubility forms nucleate boiling, and second, partial solubility is necessary to effect clathrate formation.

For the operation of the system to supply heat, the body 10 of PCM which may be in molten condition or may be melted later is introduced into the container 12 through the port and the closure 24 is secured in place by latch 26. Air and other gases in the container 10 are then evacuated through the pipe 28 and heat transfer fluid is introduced through the pipe 30 to form a second body, shown as layer 16 in contact with the PCM. The heat transfer fluid can also form as a layer below the PCM, (not shown) if its density is higher than that of the PCM; the heat transfer fluid may also, if its density is closely matched to that of the PCM, become dispersed through the PCM. Mechanical details of the system are then modified accordingly. The quantity of PCM introduced is such that after melting, there will, in vapor transfer applications, be a free space 32 for passage of vaporized heat transfer fluid to the heat exchanger/condenser 18. The quantity of heat transfer fluid used is sufficient to saturate the molten PCM and to maintain a body of liquid continuously in contact with the PCM during operation.

The densities of the heat transfer fluids are, in the configuration shown, lower than the densities of the PCM so that the heat transfer liquid remains as a layer 16 on top of the body of molten PCM in the container. Heat transfer from the PCM causes boiling in the region of largest temperature differential which, initially, is the interface 20 between the two liquids. But, as boiling continues, turbulence causes mixing of the two components and boiling occurs from the mixture within the body of crystallizing melt as well as at the interface 20. This self-mixing is also partially responsible for creating a mass of small crystals which do not form a solid mass or crust, but, instead, a suspension of isolated crystallites in the fluid. This action enhances a steady release of heat from the melt and eliminates the thermal inhomogeneity characteristic of non-convective crystallizing PCM systems.

As noted above it is, in cases where the heat transfer fluid is less dense than the molten PCM, preferred to use heat transfer fluids which are partially soluble in the molten PCM, since these fluids give further improvement in internal boiling and fluidization of the body of PCM due to vaporization of the dissolved fluid within the body of the melt. This improvement becomes particularly effective where the solubility of the heat transfer fluid exceeds about 2% by volume, preferably exceeding about 5% by volume based on the volume of the molten PCM.

It has also been found desirable to add a small amount of water or other protic solvent to the PCM in excess of its water of crystallization. The additional water or other solvent is enough to form a residual PCM solution which, if distributed evenly throughout the mass forms a liquid film separating the crystals. In practice, about 5% of water has been found effective to improve the freedom of crystals in a totally spent PCM mass to move when the mass of PCM is stirred.

Vapors of the heat transfer fluid pass to the heat exchanger/condenser 18 where they are condensed to give up their heat of condensation to the water or other fluid, including air, passing through the coils of the condenser 18. In the form shown in FIG. 1, condensed heat transfer liquid is permitted to fall back in the layer 16 of liquid on the body 10 of PCM to replenish the body of liquid.

An important advantage of the system using molten PCM and heat transfer fluid is that, since the PCM supplies heat at a constant temperature, simple cutting off the fluid passing through the coils of the condenser will stop evolution of heat from the PCM except for the amount balancing the, ideally negligible, heat loss through the insulation 14. That is, aside from losses due to imperfect insulation of the system, the vapor pressure of the heat transfer fluid will build up to a value at which no further vaporization of the fluid can occur at the fixed temperature at which the phase change of the PCM can supply heat. Conversely, in the moment that heat withdrawal through the condenser is resumed, vaporization of the liquid, and transfer of useable heat out of the PCM begins again.

In another form, (see FIG. 2), condensate from the heat exchanger/condenser 34 may be collected in a trough 36 and flowed through a conduit 38 to a fluid reservoir 40 which may or may not be insulated. Fluid collected in the reservoir is then forced by the pump 42 through a conduit 44 to injection nozzles 46 disposed in the lower portion of the container 48. The injected fluid provides further turbulent mixing in passing up through the molten PCM to ensure good contact between the fluid and the molten PCM and a high rate of vaporization. This form of the system is particularly useful to ensure that the PCM forms a crystallite slurry or mush where the heat transfer fluid is lighter than and insoluble in the molten PCM.

The PCM may be recharged by a simple heating element 50 disposed in the body of material as shown in FIG. 1. This heating element 50 may be an electrical resistance element using, for example, offpeak electrical energy or a heat exchange element through which a steam line or a waste heat conduit or a solar heated fluid may be passed.

Figure 2:
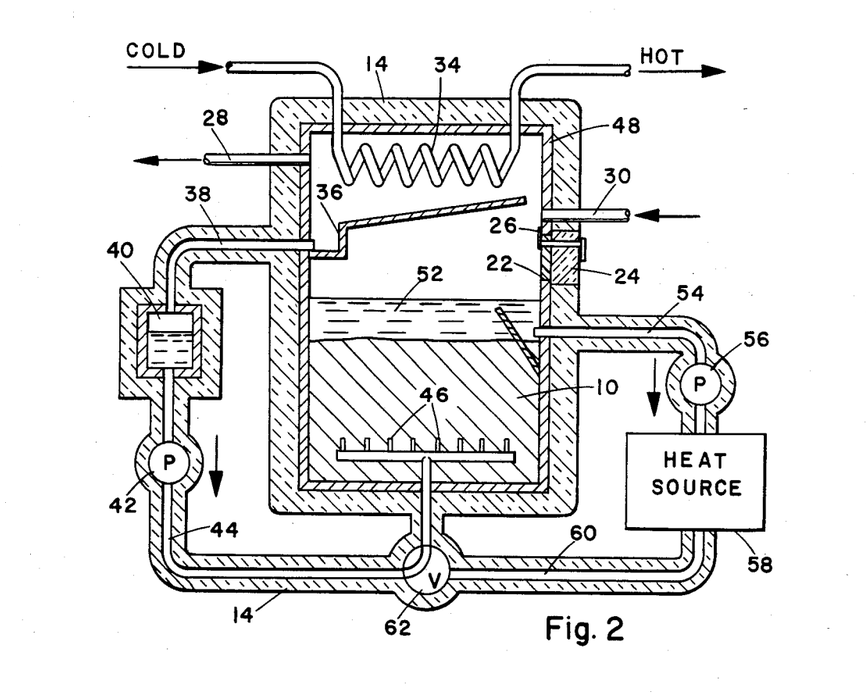
FIG. 2 is a side elevation view in section of a further form of the latent heat storage and transfer system.
Figure 3:
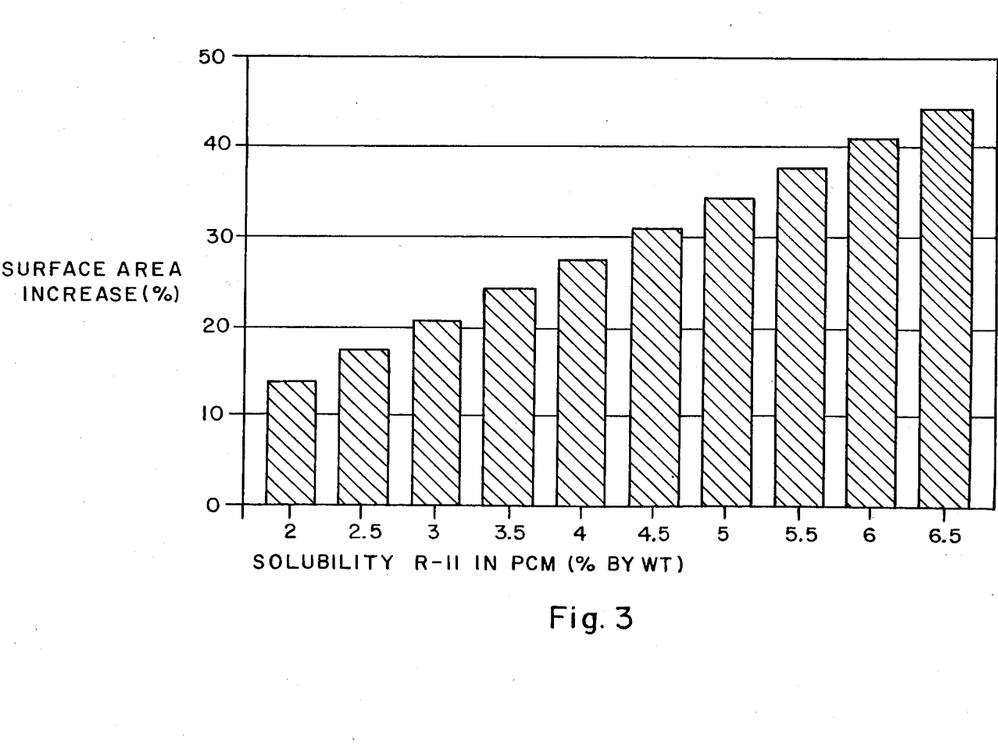
FIG. 3 shows the relationship between the effect of increasing solubility of the heat transfer material, R-11, and the surface area available for heat transfer.

Also, as shown in FIG. 2, because the exhausted PCM in this system is a crystallite slurry or mush instead of a solid mass, the PCM may be recharged by direct circulation of heated transfer fluid upwards through the crystalline slurry or mush to melt it. In this form, transfer fluid either from the layer 52 in the container 48 or from storage drawn off through the pipe 54 is forced by pump 56 through an external heat source 58 which may be waste, heat, steam, a solar collector, an air or water cooling unit or other source and then through a pipe 60 for injection through the nozzles 46 into the body of PCM. These nozzles 46 may be the same nozzles as used to supply heat transfer fluid to the PCM in the heat supply mode, by using the valve 62 to cut off connection between the pump 42 used during heat supply and allow passage of fluid from the recharging pump 56. Heat transfer fluid condensed in melting the body of PCM may be withdrawn and pumped for heating to the external heat source and again injected into the mass of PCM.

In an alternative system useful particularly where the heat transfer fluid is partially soluble in the PCM to induce turbulence through internal boiling and/or where the heat transfer fluid has a higher specific gravity then the PCM, the heat exchanger element may be in contact with or immersed in the molten PCM. The turbulence and the retrograde boiling of the heat transfer fluid expelled from the crystallizing PCM serves to resist build-up of crystallized PCM on the heat exchanger surface during the heat removal cycle and heat transfer by condensation of heat transfer fluid on the heat exchanger is augmented by heat transfer by conduction from the hot heat transfer fluid in liquid phase and from the molten PCM to the heat exchanger surface. Additionally, the turbulence provides a high mass flux of the molten PCM and the heat transfer liquid past the heat exchanger surface to increase the rate of heat removal. The presence of the heat transfer fluid is also useful during the heating of the PCM since the fluid will transfer heat from the heat exchanger surface to the PCM across any spaces which may have developed between the surface and the solidified PCM.

Where the PCM has been completely melted and it is desired to prevent it from supercooling, a small diameter side tube 64 (see FIG. 1) including a horizontal portion 66 communicating with the body of PCM below its surface 20 and a vertical portion 68 extending outside the container 12 is filled with solid PCM. Since the tube 64 is not insulated, the PCM inside it will remain solid. When the body 10 of molten PCM in the container 12 cools to its freezing point, the solid PCM in the tube 64 will trigger crystallization of the PCM in the container 12 without physical transfer of any seed crystals from the tube to the PCM. The tube 64 may be provided with a valve 65, kept at the same temperature as the PCM. By closure of valve 65, the charged PCM is isolated from the nucleation tube 64 to prevent nucleation and release of the heat of crystallization from the PCM. When the sensible heat is withdrawn from the PCM either through the condenser or by slow heat leakage through the insulation, the PCM cools to ambient temperature in a supercooled state in which it may remain practically indefinitely until it is purposefully nucleated by opening of valve 65 leading to release of the stored latent heat of crystallization at the melting temperature of the PCM. It will be understood that the heat transfer liquid circulation, PCM heating and melting and other apparatus and method parts of the systems shown in FIGS. 1 and 2 may be used in any combination to make complete charge discharge cycles.

While the operation of the system has been described primarily for the storage and delivery of heat, it will be understood that the system may also be used for storing thermal energy in a cooling system, and the term "heat transfer" is used to make this fact clear. In a cooling system, the heat transfer liquid is run through a heat exchanger accessed to a cold sink, for example, cold night air, and takes up heat from the PCM to solidify it. When cooling is needed, the heat transfer liquid is pumped to the point where heat is to be absorbed, e.g. a room or other space to be cooled and vaporizes to effect cooling. The vapor is then returned to the body of solidified PCM where it melts and gives up heat to the PCM and is condensed for recirculation.

The following examples are provided to aid in understanding the invention but it is to be understood that the invention is not restricted to the particular apparatus, materials, temperatures, or procedural details of the examples.

EXAMPLE 1

Solid to liquid phase change material (PCM) in the form of sodium acetate trihydrate granules containing 4.8 mass percent of added water is loaded into the container of a heat storage and supply system similar to that shown in FIG. 1 but with no. 50 indicating a resistance heater powered by electricity, obtainable at a low off peak rate. The container is sealed, evacuated to remove air and other gases and loaded with a volume of $CCl_3F$ (Freon 11) corresponding to about 5 percent of the volume of the PCM. The heat transfer liquid (Freon 11 with density 1.49 at 21° C. is lighter than the crystalline PCM with density 1.52.

The PCM is charged by melting with the electric heater and stores 265 kJ/kg (344 kJ per liter of melt) as latent heat of melting. An additional 3.22 kJ/kg is stored as sensible heat for each degree C. that the PCM is heated above the melting temperature at 58° C. At melting the density of the PCM decreases to about 1.3, less than the density of 1.40 of the heat transfer fluid at 58° C. This results in an inversion of the liquids so that the originally lighter Freon heat transfer fluid now sinks and forms a layer below the PCM melt; this inversion contributes to mixing of the system at melting.

As heat is added to the system, an increasing portion of the Freon will enter the free space above the melting PCM as vapor and increase the internal vapor pressure in equilibrium with the liquid Freon. When the solid-liquid phase change material is completely melted, the device is fully charged by latent heat. Heating may be continued by adding sensible heat to the PCM until it reaches a predetermined upper temperature limit where a switch is operated to disconnect the heat source. The system remains in this state (except for heat loss by imperfect insulation) until the discharge mode is initiated.

To remove heat from the system (in the heat use mode), cold water is allowed to flow through the heat exchanger coil at the top of the container and the hot Freon vapor condenses on the exchanger surface, transferring 33 kJ/kg as heat of condensation and an additional amount of sensible heat to the water flowing through the coil. Liquid Freon drips off the condenser back to the body of molten PCM through which it sinks down, absorbing more heat until it revaporizes by boiling.

By this removal of sensible heat, the temperature of the molten PCM is brought down to the melting point, 58° C., where crystallization of the PCM begins, initiated by the crystals in the nucleation tube 64. The crystallizing phase change material now begins to release its latent heat of fusion at a rate of 265 kJ/kg of crystalline sodium acetate trihydrate and continues this energy release at a constant temperature of 58° C. until practically all of the PCM has crystallized. During this entire process, and until ambient temperature has been reached, the Freon below and within the PCM boils vigorously, creating turbulent mixing and efficient heat exchange with the PCM by greatly increasing the contact surface area between the two liquid phases and the crystals. The exchange is augmented by the settling of the condensed Freon through the PCM. This self-mixing promotes rapid and efficient heat removal from the melt.

A continuous cycle is produced with the Freon being circulated as vapor and liquid between the condenser and the body of boiling liquid Freon below and within the crystallizing melt. The cold water entering the condenser coil absorbs the vapor transported heat released from the melt and leaves as hot water. The cycle continues until the crystallization of the melt at 58° C. has reached completion and until thereafter excess sensible heat has been removed and ambient temperature has been reached. The crystallized mass is mushy in consistency with Freon distributed through it and as a layer at the surface due to the larger density of the crystallized PCM.

The discharge of heat from the system can be interrupted at any point during the discharge mode by shutting of the flow of cold water through the condenser. This stops condensation of vapor on the coil which increases the vapor pressure within the container so that boiling of the Freon ceases. Cooling and crystallization of the melt then stop immediately since the Freon can no longer vaporize and cool the melt. Allowing for insulation losses, the device will remain in the partially discharged state until cold water is once again passed through the condenser.

EXAMPLE 2

The procedure of this example is similar to that of Example 1 except that heat for melting the liquid-solid phase change material is supplied by a flow of solar heated $(CClF_2)_2$ (Freon 113) through a heat exchanger coil (50) disposed in the lower portion of the container and that a different solid-liquid phase change material and different internal liquid-vapor heat transfer fluid are used.

In this example, granules of sodium thiosulfate pentahydrate containing 5% water, and Freon 114, $(CClF_2)_2$, are used as the active internal components. The granules are melted and store heat at a rate of 180 kJ/kg of latent heat at the melting temperature of 48° C. Above the melting temperature heat is stored as sensible heat at 2.38 kJ/kg°C. The Freon 114 has a boiling point at 3 atm. pressure of about 48° C. and a heat of condensation/vaporization of 35.4 kJ/kg.

The system delivers heat efficiently and is easily stopped and started as in the system of Example 1. The crystallized material after discharge of the system is a crystal mush or slurry.

EXAMPLE 3

In this example, the heat storage material is a near eutectic mixture of $MgCl_2.6H_2O$—$Mg(NO_3)_2.6H_2O$ with 4 percent excess water, and the volatile heat transfer material is Freon 21, $CHCl_2F$. In this example, the apparatus shown in FIG. 2 is used in which the volatile low density heat transfer liquid on the surface of the molten material is withdrawn, heated by an external heat source and pumped back for injection through the nozzles (46) into the body of crystalline PCM mush to provide improved agitation of this phase change material for superior heat transfer between the PCM and the Freon during melting. In this example, the injected Freon rises up through the mush of salt solution and crystalline eutectic material to melt it at a temperature near 56° C. When the system is completely melted, the heating circuit is cut off by the valve, the discharge circuit is opened by turning the valve and cold water is supplied to the condenser coil. The Freon 21 has a boiling point of 56° C. at about $3\frac{1}{2}$ atm. and a heat of vaporization/condensation of 44.89 kJ/kg.

In this case, the Freon condensing on the coil is collected by the trough and led to a Freon reservoir from which it is pumped and injected into the body of molten material through the jets in the lower portion of the container. The turbulence and dispersion of Freon by these jets takes the place of the self-mixing effect of more vigorous internal boiling and boiling from below which occurs with other pairs, although internal boiling occurs with this pair but to a smaller extent than with the previous examples.

EXAMPLE 4

In a system operated for refrigeration, the heat storage material (PCM) is water ice, with heat of melting 335 kJ/kg with which 5.5% by weight of diethylene glycol has been included so that the frozen PCM is a slush of ice crystals instead of a solid mass. The volatile heat transfer fluid is 1,1,1-chloro difluoroethane (Freon R-142b), having a boiling point of −9.7° C. at 1 atm, and a density larger than that of water and ice so that it forms a layer below the ice slush (PCM). When the system is charged for cooling (PCM frozen), the heat transfer fluid in liquid state is pumped from the bottom of the container through a coil in the space to be refrigerated and is vaporized to withdraw heat from and cool the space. The vapor then is returned into and is condensed on the ice slush PCM to release its heat of vaporization which is taken up in melting portions of the ice crystals of the slush. The condensed heat transfer fluid sinks to the bottom and is thus separated from the -melt water mixture, and is pumped through the system for continued refrigeration of the space until the ice crystals have completely melted.

The system may be recharged at night when electric power is available at low price, or during winter when outside temperature falls below 0° C., by a refrigeration coil (18) disposed in the upper part of the container. The liquid pumped through this coil is cooled by an electrically powered refrigerator or by exchange with outside ambient subzero air. Freon in the layer below the molten PCM boils, removes heat from the PCM, condenses on the refrigeration coil, falls down on the PCM and sinks back toward the Freon layer.

EXAMPLE 5

In a system operated for space cooling, the heat storage material (PCM) is a eutectic composition $NH_4Cl.Na_2SO_4.10H_2O$ with heat of melting at 11° C. of 163 kJ/kg, with which 4 percent by weight of water has been included so that the frozen PCM is a slush of solid crystals with density 1.49 in heat transfer liquid and a small volume of brine solution, instead of a solid mass. The volatile heat transfer fluid is $(CClF_2)_2$ (Freon R-114) with a boiling point of 3.8° C. at 1 atm, heat of vaporization of 35.4 kJ/kg and density 1.46. When the system is to be used for cooling (PCM in frozen state), a separate liquid heat transfer fluid such as $CHCl_2F$ (Freon 21) is pumped through fan coils in the space to be cooled and is there vaporized, withdrawing heat by absorbing sensible heat and heat of vaporization. The resulting vapor is returned through the heat exchanger (50) where it gives up heat by melting the PCM, and condenses to liquid which is again withdrawn and pumped through the system for continued space cooling until the PCM is completely discharged (melted).

The system may be recharged (molten PCM cooled to freezing) using radiative cooling at nightly radiation temperatures below 11° C. For this purpose vapor is withdrawn from the space above the PCM; this causes the heat transfer liquid to boil. The Freon is in this case dispersed through the PCM because of their closely matching densities. The Freon vapor withdrawn is pumped through a radiator emitting heat into the night sky. The vapor transfers sensible heat and heat of condensation to the radiator and the condensed, cold liquid is returned to the container, where it disperses in the PCM, absorbs more heat and boils off again until the PCM is frozen into a fluid mush and its temperature lowered further below 11° C. to the prevailing night radiation temperature.

We claim:

1. A latent and sensible heat storage and transfer system comprising a container, a body of fusible, crystallizable, liquid-solid phase change heat storage material in said container, water amounting to about 5% in excess of the water of crystallization of said heat storage material, a body of volatile liquid heat transfer material in direct contact with said eat storage material for evaporation by sensible heat and by latent heat given up in crystallization from molten state of heat storage material to deliver heat from the system, a condenser/heat exchanger for taking up heat of condensation from vapors of said heat transfer liquid and means for heating and melting said heat storage material, said heat transfer material having a boiling point not higher than the crystallization temperature of said heat storage material at the vapor pressure in said container during delivery of heat.

2. The system as defined in claim 1 in which said means for heating is a heating element disposed in said body of heat storage material and in which said condenser/heat exchanger is positioned and arranged in free space above the body of heat storage material and heat transfer liquid in said container to return condensed heat transfer material substantially directly to said body of liquid.

3. The system as defined in claim 1 in which said body of liquid heat transfer material has a density greater than Zthat of said heat storage material and forms a layer below said heat storage material.

4. The system as defined in claim 1 in which said condenser/heat exchanger is immersed in said body of heat storage material.

5. The system as defined in claim 1 in which said condenser/heat exchanger is immersed in said body of liquid heat transfer material.

6. The system as defined in claim 1 comprising means for bringing said body of heat storage material containing up to 5% in excess of the water of crystallization of said heat storage material into contact with a seed crystal of said heat storage material without physical transfer of the seed crystal into the material.

7. The system as defined in claim 1 comprising means to stop cooling of the condenser/heat exchanger to allow the vapor pressure of the heat transfer material in the container to increase to a value equal to the vapor pressure of the heat transfer material at the resting temperature of the heat storage material to prevent further evaporative cooling and stop delivery of heat from said storage material.

8. The method of latent and sensible heat storage and transfer comprising (1) providing a body of hot, molten crystallizable phase change heat storage material in a closed container containing about 5% by weight, water or other protic solvent of said heat storage material, (2) disposing a body of volatile liquid-vapor phase change heat transfer material that is significantly admissible in said heat storage material in liquid state in direct contact with said molten heat storage material, (3) crystallizing portions of said heat storage material to release heat of crystallization for vaporizing portions of said body of heat transfer material, (4) maintaining the vapor pressure of heat transfer material in said container sufficiently high to retain portions of said heat transfer material in liquid state in contact with said body of heat storage material and (5) recovering latent and sensible heat by condensing vaporized heat transfer material, said heat transfer material having a boiling point of the vapor pressure in said container during heat recovery not higher than the crystallization temperature of said heat storage material.

9. The method as defined in claim 8 in which condensed heat transfer material falls by gravity to said body of heat transfer material, directly or by settling through the body of liquid heat storage material.

10. The method as defined in claim 8 in which a body of crystalline heat storage material is introduced into said container and is heated in said container to form said body of molten heat storage material.

11. The method as defined in claim 10 in which liquid heat transfer material is withdrawn from said body heated to vaporize it and injected beneath the surface of said body of heat storage material to heat and melt said heat storage material.

12. The method as defined in claim 10 in which said heat storage material is heated and melted by a heating element disposed beneath the surface of said body of heat storage material.

13. The method as defined in claim 8 in which said body of liquid heat transfer material has a density less than that of said of heat storage material and forms a layer above said heat storage material.

14. The method as defined in claim 8 in which said body of liquid heat transfer material has a density greater than that of said heat storage material and forms a layer below said heat storage material.

15. The method as defined in claim 8 in which latent and sensible heat is collected on a condenser/heat exchanger surface disposed in a free space above said bodies of heat transfer material and heat storage material.

16. The method as defined in claim 8 in which latent and sensible heat is collected on a condenser/heat exchanger surface disposed in contact with said body of heat storage material.

17. The method as defined in claim 8 in which latent and sensible heat is collected on a condenser/heat exchanger surface disposed in contact with said body of liquid heat transfer material.

18. The method as defined in claim 8 in which delivery of heat is stopped by interruption of condensation of said heat transfer material to allow the vapor pressure of the heat transfer material in the container to increase to a value equal to the vapor pressure of the heat transfer material at the resting temperature of the heat storage material to prevent evaporative cooling of the heat storage material and prevent incipient or continued crystallization.

19. The method as defined in claim 8 in which said heat transfer material is a liquid halocarbon having a boiling point, at atmospheric pressure, of from about $-30°$ C. to about 80° C.

20. The method as defined in claim 8 in which said heat storage material has a melting point of from about $-20°$ C. to about 95° C.

21. A latent and sensible heat storage and transfer system comprising a container, sodium acetate trihydrate, 4.8% water in excess of the water of crystallization of said sodium acetate trihydrate, a body of volatile liquid $CCl_3F$ heat transfer material in direct contact with said heat storage material for evaporation by sensible heat and by latent heat given up in crystallization from molten state of heat storage material to deliver heat from the system, a condenser/heat exchanger for taking up heat of condensation from vapors of said heat transfer liquid and means for heating and melting said heat storage material, said heat transfer material having a boiling point not higher than the crystallization temperature of said heat storage material at the vapor pressure in said container during delivery of heat.

22. A latent and sensible heat storage and transfer system comprising a container, sodium thiosulfate pentahydrate, 5% water in excess of the water of crystallization of said sodium thiosulfate pentahydrate, a body of volatile liquid $(CClF_2)_2$ heat transfer material in direct contact with said heat storage material for evaporation by sensible heat and by latent heat given up in crystallization from molten state of heat storage material to deliver heat from the system, a condenser/heat exchanger for taking up heat of condensation from vapors of said heat transfer liquid and means for heating and melting said heat storage material, said heat transfer material having a boiling point not higher than the crystallization temperature of said heat storage material at the vapor pressure in said container during delivery of heat.

23. A latent and sensible heat storage and transfer system comprising a container, $MgCl_2.6H_2O—Mg(NO_3)_2.6H_2O$, 4% water in excess of the water of crystallization of said $MgCl_2.6H_2O—Mg(NO_3)_2.6H_2O$, a body of volatile liquid heat transfer material $CHCl_2F$ in direct contact with said heat storage material for evaporation by sensible heat and by latent heat given up in crystallization from molten state of heat storage material to deliver heat from the system, a condenser/heat exchanger for taking up heat of condensation from vapors of said heat storage material, said heat transfer material having a boiling point not higher than the crystallization temperature of said heat storage material at the vapor pressure in said container during delivery of heat.

24. A latent and sensible heat storage and transfer system comprising a container, water, and 5.5% by weight diethylene glycol, a body of volatile liquid heat transfer material 1,1,1-chlorodifluoroethene in direct contact with said heat storage material for evaporation by sensible heat and by latent heat given up in crystallization from molten state of heat storage material to deliver heat from the system, a condenser/heat exchanger for taking up heat of condensation from vapors of said heat transfer liquid and means for heating and melting said heat storage material, said heat transfer material having a boiling point not higher than the crystallization temperature of said heat storage material at the vapor pressure in said container during delivery of heat.

25. A latent and sensible heat storage and transfer system comprising a container, $NH_4Cl.Na_2SO_4.10H_2O$, 4% water in excess of the water of crystallization of said $NH_4Cl.Na_2SO_4.10H_2O$, a body of volatile liquid $(CClF_2)_2$ heat transfer material in direct contact with said heat storage material for evaporation by sensible heat and by latent heat given up in crystallization from molten state of heat storage material to deliver heat from the system, a condenser/heat exchanger for taking up heat of condensation from vapors of said heat transfer liquid and means for heating and melting said heat storage material, said heat transfer material having a boiling point not higher than the crystallization temperature of said heat storage material at the vapor pressure in said container during delivery of heat.

26. A latent and sensible heat storage and transfer system comprising a container, water, a body of volatile liquid heat transfer material, $CCl_3F$, in direct contact and partially soluble in said heat storage material for evaporation by sensible heat and by latent heat given up in crystallization from molten state of heat storage material to deliver heat from said system, a condenser/heat exchanger for taking up heat of condensation from vapors of said heat transfer liquid and means for heating and melting said heat storage material, said heat transfer material having a boiling point not higher than the crystallization temperature of said heat storage material at the vapor pressure in said container during delivery of heat.

27. A latent and sensible heat storage and transfer system comprising a container, water, a body of volatile liquid heat transfer material, $CHCl_2F$, in direct contact and partially soluble in said heat storage material for evaporation by sensible heat and by latent heat given up in crystallization from molten state of heat storage material to deliver heat from said system, a condenser/heat exchanger for taking up heat in condensation from vapors of said heat transfer liquid and means for heating and melting said heat storage material, said heat transfer material having a boiling point not higher than the crystallization temperature of said heat storage material at the vapor pressure in said container during delivery of heat.

28. A latent and sensible heat storage and transfer system comprising a container, water, a body of volatile liquid heat transfer material $CCl_2F_2$ in direct contact and partially soluble in said heat storage material for evaporation by sensible heat and by latent heat given up in crystallization from molten state of heat storage material to deliver heat from said system, a condenser/heat exchanger for taking up heat of condensation from vapors of said heat transfer liquid and means for heating and melting said heat storage material, said heat transfer material having a boiling point not higher than the crystallization temperature of said heat storage material at the vapor pressure in said container during delivery of heat.

* * * * *

UNITED STATES PATENT AND TRADEMARK OFFICE
CERTIFICATE OF CORRECTION

PATENT NO. : 4,696,338

DATED : September 29, 1987

INVENTOR(S) : Jensen et al.

It is certified that error appears in the above-identified patent and that said Letters Patent is hereby corrected as shown below:

Column 11, claim 1, line 48, "eat" should be --heat--

Column 12, claim 3, line 1, "Zthat" should be --that--;

Signed and Sealed this

Tenth Day of May, 1988

Attest:

DONALD J. QUIGG

Attesting Officer

Commissioner of Patents and Trademarks